United States Patent
Ando et al.

[11] 3,775,592
[45] Nov. 27, 1973

[54] PROCESS CONTROL SYSTEM BY MEANS OF PATTERN RECOGNITION

[75] Inventors: Masahisa Ando; Kunihisa Hayashi, both of Toyota-shi, Japan

[73] Assignee: Toyota Jidosha Kogyo Kabushiki Kaisha, Toyota-shi, Japan

[22] Filed: Sept. 14, 1971

[21] Appl. No.: 180,292

[30] Foreign Application Priority Data
Sept. 18, 1970 Japan.............................. 45/82396

[52] U.S. Cl......... 235/61.6 A, 235/151.11, 318/567
[51] Int. Cl. ............................................ G06k 11/00
[58] Field of Search.................... 318/567, 570, 571, 318/162, 163; 235/151.11, 151.11 I, 61.6 A, 61.6 B

[56] References Cited
UNITED STATES PATENTS

| | | | |
|---|---|---|---|
| 3,559,021 | 1/1971 | Bingham, Jr........................ | 318/571 |
| 3,624,371 | 11/1971 | Neal et al. ...................... | 235/151.11 |
| 3,099,781 | 7/1963 | Herchenroeder................... | 318/570 |
| 3,417,303 | 12/1968 | Rueteler ............................. | 318/570 |
| 3,493,762 | 2/1970 | Dulebohn ...................... | 235/151.11 |
| 3,539,895 | 11/1970 | McGee ........................... | 318/570 |

Primary Examiner—Daryl W. Cook
Attorney—Cushman, Darby & Cushman

[57] ABSTRACT

An automatic process control system in which a model of the process is prepared in the form of a two-dimensional pattern, coordinates of the pattern being defined by two parameters representing two kinds of information signals derived from the process, whereby the two information signals are converted to a single signal representing a spot in the pattern, and on the basis of the single signal a set of control signals are produced through appropriate signal processing means to be fed back to the process.

4 Claims, 8 Drawing Figures

FIG. 3

| COMMAND / ADDRESS | OPERATION | | | | | |
|---|---|---|---|---|---|---|
| | X | | | Y | | |
| | up | hold | down | up | hold | down |
| p−1 | ○ | | | | | ○ |
| p | | ○ | | | | ○ |
| p+1 | | | ○ | | | ○ |
| p+2 | | | ○ | | | ○ |
| p+3 | | | ○ | | ○ | |
| n−1 | ○ | | | | ○ | |
| n | | ○ | | | ○ | |
| n+1 | | | ○ | | ○ | |
| n+2 | | | ○ | | ○ | |
| n+3 | | | ○ | ○ | | |
| m | | ○ | | | ○ | |
| l | | ○ | | ○ | | |

PROCESS CONTROL SYSTEM BY MEANS OF PATTERN RECOGNITION

BACKGROUND OF THE INVENTION

1. Field of the Invention

This invention relates to an adaptive process control system in which the control signal is produced on the basis of deviation of the result of the process from a preset process model, particularly to such a system in which a two-dimensional pattern is used as the process model.

2. Description of the Prior Art

In order to automatically control a process according to a preset scheme, it is essential to previously study what control signal should be given to the process in response to information concerning an output of the process and to let the control system memorize the performance function. If, however, the objective control involves a performance function of multi-elements and high order, it will be very difficult to completely grasp the plurality of dynamic characteristics of the performance and to concurrently control so many dynamic factors which are mutually related. Though there may be a case where a function of multi-elements and high order seems to have been successfully dealt with, it is in fact not so. It will be seen in such a case that the object has been achieved only in approximation, fo example by replacing the multi-element high order function with a single element low order function, the level of quality of the control being thus depreciated.

With the recent progress of large scale electronic computors in the background, great efforts have been made to obtain input information from real output information by previously providing the computor with vast data and programes concerning the relations between input and output information as well as simulation models of the system and further by additionally using a sophisticated analogue computor.

SUMMARY OF THE INVENTION

The object of the present invention is to achieve the adaptive control of a process involving a performance function of two or less elements without using any complicated information handling machines such as large scale electronic computors.

In order to achieve the above object, this invention is characterized in that the model of the system is presented in the form of a two-dimensional pattern and that two outputs expressing information which reflect the results of the control are converted into a single signal using the said pattern and a pattern recognition means.

This invention will be clarified hereunder with reference to the accompanying drawings.

BRIEF DESCRIPTION OF THE DRAWINGS

FIG. 3 is a diagram used for explaining a command generator included in the system of this invention.

DESCRIPTION OF THE PREFERRED EMBODIMENTS

Figure 1:
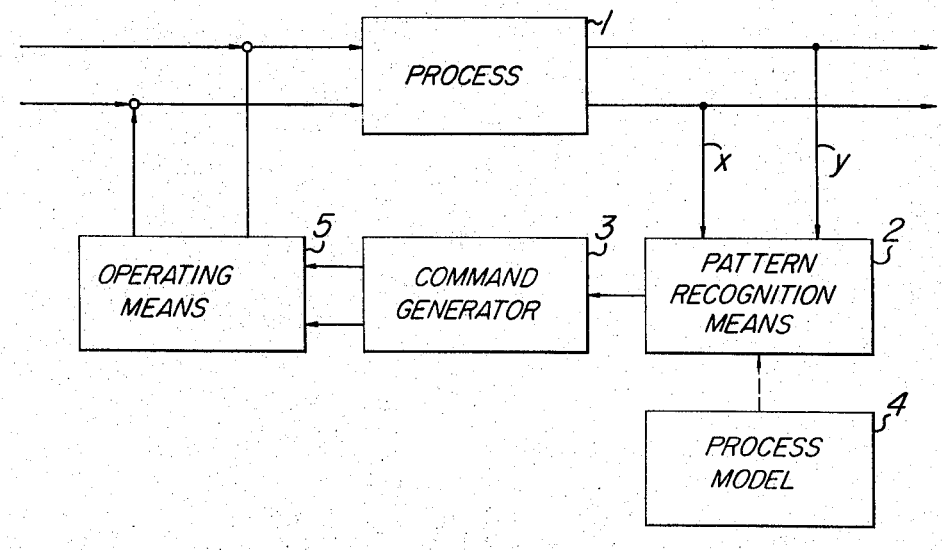
FIG. 1 is a typical block diagram of the control system of this invention.

Referring to FIG. 1 which shows a block diagram of the whole control system of this invention, two information outputs derived from the process 1 are compared, in a pattern recognition means 2, with a process model 4 which is in the form of a pattern to be thereby converted into a single signal which is transferred to a command generator 3. The command generator 3 produces a plurality of information signals which are fed back to the process 1 after having been converted into analogue quantities through an operating means 5.

Figure 2:
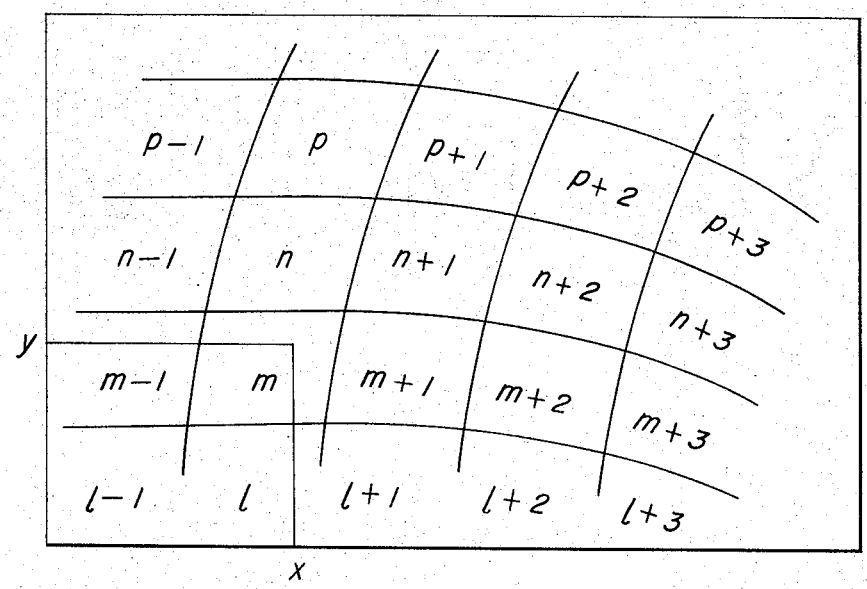
FIG. 2 is a diagram used for explaining the function of the pattern recognition means.

Referring to FIG. 2 which generally expresses the function of the pattern recognition means 2, the current state of the process 1 is shown on an X-Y plane as a point $(s, y)$ defined by two information outputs $(x, y)$. The X-Y plane has been divided into a number of regions, an address being assigned to each region. The information outputs $(x, y)$ are recognized as the address of the region within which the point $(x, y)$ falls. Namely, the information outputs $(x, y)$ are converted into a single signal representing the address of the region, and the single signal is tranferred to the command generator 3.

Referring to FIG. 3 which illustrates the function of the command generator 3, there is previously prepared a chart for determining which input information should be imparted to the process 1 in response to each information output given in terms of the address in the pattern. In the exmaple shown in FIGS. 2 and 3, it is assumed that the state of the process 1 should be maintained so as to give an output information $(x, y)$ corresponding to an address $n$ in the pattern. If the current state of the process 1 falls within a region identified by address 1, the command to be issued is: "X . . . HOLD" and "Y . . . UP." If the said state corresponds to address "$n-1$," then the command is : "X . . . UP" and "Y . . . HOLD."

Figure 4:
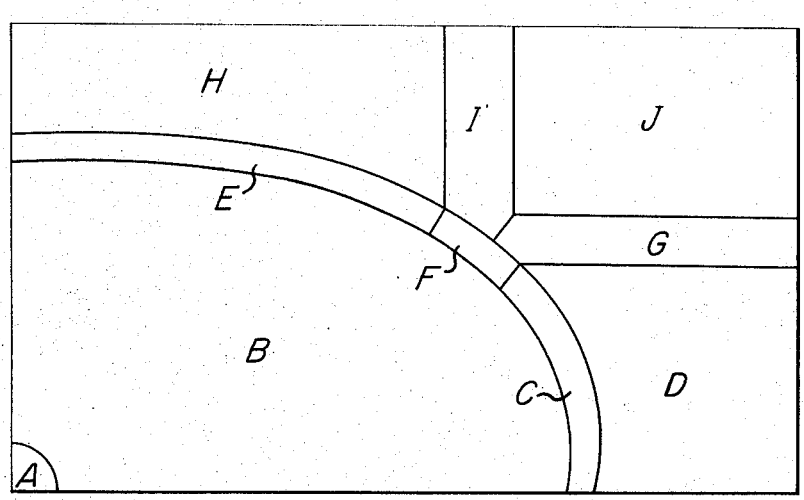
FIG. 4 is an example of the pattern used for the control of a machine tool.

Referring to FIG. 4 which shows an example of the pattern representing the process model, such a pattern can be used for the pattern shown in FIG. 2, it being directly drawn on the X-Y plane of the pattern recognition means 2 and an address being assigned to each section or region of the pattern. The practical application of this measure will be described hereinafter, With this measure, the capacity of the command generator 3 can be reduced, whereas the setup of the model becomes less versatile. Therefore, this measure is effective where the optimum model is definitely known.

As an alternative measure, the pattern of a process model can be set in the system by dividing the X-Y plane into a large number of parts and writing the pattern into the command generator 3. With this measure, the capacity of the command generator must be enlarged, but the versatility of the X-Y plane of the pattern recognition means increases. If an electronic computor is used for the command generator 3, change or modification of the model will be very simple and easy. Therefore, this measure is useful as an experimental method for finding the optimum model. It will be understood that the scope of the application of the present system is further extended by utilizing the technique of a graphic display device consisting of a cathode ray tube and an electronic computor, for forming the quantized X-Y plane.

Whichever measure be taken, the system of this invention has an additional advantage in that the state of the system can be visually grasped with ease, as the state is dynamically expressed on the X–Y plane of the pattern recognition means 2.

An example of the practical control of a cutting with the system of this invention will be described hereunder with reference to FIG. 4, assuming that the process model has been written directly on the X–Y plane of the pattern recognition means 2. The object of the control is to let the machine perform as much cutting as the capability of the machine and the tool allow. In this case, the output information effective for the control of the cutting process may be the cutting force and the temperature of the tool at the tip thereof.

Expressing the cutting force by a variable $x$ and the temperature of the tool tip by $y$, it is assumed to be previously known that the optimum state for the cutting is obtained if the point defined by coordinates $x$ and $y$ falls within region F in the pattern shown in FIG. 4. In order to facilitate the access to the optimum state or the region F of the process pattern and the maintenance of the state within the region F regardless of the change of the shape of the work, the X–Y plane is divided as shown in FIG. 4. Section A is the region where the index point P of the information outputs $(x, y)$ should fall when zero output information is received, that is, during the idle running of the tool. The counteraction $x$ is to be still increased in regions B, E and H, but it is to be decreased in regions D, G and J, while it is appropriate in regions C, F and I. The tip temperature $y$ is to be increased in regions B, C and D, but to be decreased in regions H, I and J, while it is appropriate in regions E, F and G.

Generally, the cutting force is mainly governed by the feedrate, while the tip temperature is largely influenced by the cutting speed. Therefore, the command for the feed should be "increase" or "UP" in regions B, E and H, "decrease" or "down" in regions D, G and J, and "hold" in regions C, F and I. On the other hand, the command for the cutting speed should be "increase" in regions B, C and D, "decrease" in H, I and J, and "hold" in E, F and G. Further, in region A which corresponds to a state of idle cutting, commands of "idle cutting speed" and "rapid feed" should be issued.

The process of the control will be described hereunder in connection with a typical cutting operation. At the start of the operation, the index point $P(x, y)$ will be in region A, as no output information is derived until the tool comes in engagement with the work-piece. Therefore, the machine is controlled so as to operate in "idle cutting speed" and "rapid feed." Upon the tool's coming in contact with the work-piece or just before that, the feed is sufficiently decreased to prevent occurrence of an excessive cutting force.

Once the cutting starts, the tool being in contact with the work-piece, the index point P $(x, y)$ moves from region A to region B with the cutting force $x$ and the tip temperature depending on the material and shape of the work-piece, the cutting speed and the feedrate. In region B, both of the cutting speed and the tool feed continue to increase under the command of "increase" for both conrols. Accordingly, the cutting force $x$ and the tip temperature continue to increase if any special change does not occur in the work-piece, and the index point P $(x, y)$ reaches either one of region E, F or C. Assuming that region E is reached, the increase of the cutting speed is stopped at once, as any further rise of the tip temperature is undersirable, while the feed continues to increase. As the cutting force is more affected than the tip temperature by the feed, the index point P proceeds toward region F and eventually enters region F directly from region E or via other regions.

In the above-described manner, the input information is continuously controlled so as to maintain the cutting conditions at the state corresponding to region F until the cutting operation is completed. If the index point which represents the cutting conditions happens to fall within region J for example, commands of "decrease the cutting speed" and "decrease the feed rate" will be issued and an additional command of "deliver cutting oil" may be issued for cooling as well as lubrication.

Figure 5:
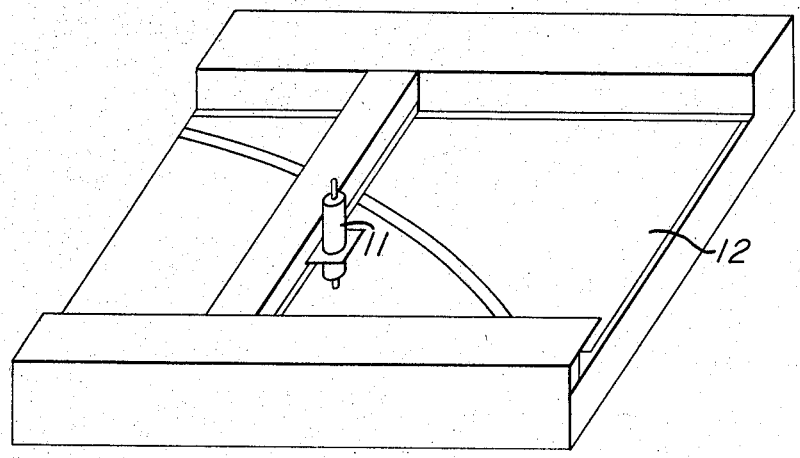
FIGS. 5 and 6 are perspective views of an embodiment of the pattern recognition means.
Figure 6:
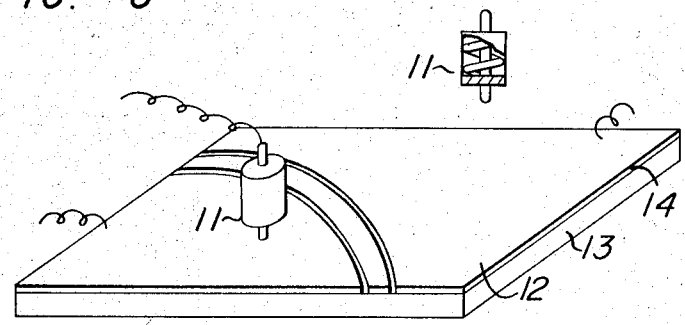

An example of the pattern recognition means 2 shown in FIG. 5 has a structure consisting of the function of the known X–Y recorder and the pattern recognizing function. The recording pen of the recorder is replaced by an electric contact 11 and the recording paper by a pattern plate 12 which comprises a plate 13 of a dielectric material and a conductive coating 14 such as copper foil or copper plating applied on the plate 13, as shown in FIG. 6. The conductive coating along the boundaries between regions is removed to thereby electrically isolate regions from one another. Each region is electrically connected with a corresponding address of the command generator 3, and only the address connected with the region on which the electric contact 11 rests is energized so as to issue a command assigned to the address.

Figure 7:
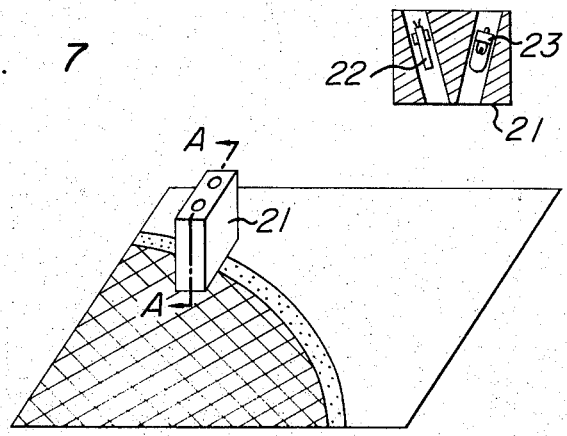
FIGS. 7 and 8 are perspective views of other embodiments of the pattern recognition means.

In another example of the pattern recognition means, which is shown in FIG. 7, regions of the pattern are given respectively different brightness and are detected by means of a photo-sensitive element. In order to avoid the influence of spurious light, a detector unit 21 as shown in FIG. 7 may be used, in which a light source 23 and a photo-sensitive element 22 are mounted within cavities, both being directed to an identical spot at the level of the plane of the pattern.

Figure 8:
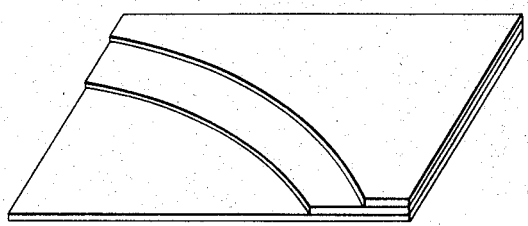

FIG. 8 is an example of a pattern in which different regions have different levels respectively, the regions can be discriminated by means of the detector unit 21 shown in FIG. 7, and the intensity of the light reflected from the surface of the pattern and received by the photo-sensitive element 22 differs depending on the level of the surface. Alternatively, the level of the surface may be directly detected by suitable mechanical or electrical measures.

In the above-described embodiments, process models have been written directly in X–Y planes. However, it will be understood that the scope of this invention is not limited to the above embodiments.

We claim:

1. A process control system for optimumly controlling factors relating to process speed using a patterned program and in response to parameters representing conditions of the process; said system comprising a pattern representing the desired relation between said parameters and the required control, means for detecting the conditions of the process and for producing information signals representing said parameters, pattern recognition means for receiving the information signals representing said parameters and producing a signal indicating the required control determined by the pattern, and a command generator for delivering command signals in response to the output signal of said pattern recognition means so as to control the factors relating to process speed.

2. A process control system according to claim 1, wherein said pattern is a two-dimensional pattern having a plurality of regions physically distinct from one another, and said pattern recognition means comprises means provided on said pattern for detecting the region in which said detecting means exists and means for moving said detecting means over said pattern in response to said information.

3. A process control system according to claim 1, wherein said plurality of regions comprises electrically conductive planes electrically isolated from one another, and said detecting means comprises an electric contacting unit which makes an electric conduction with a region of said pattern, and further, respective regions of said pattern are connected with respective counter-parts of said command generator.

4. A system as in claim 1 wherein said process is cutting and said parameters are cutting force and tool temperature.

* * * * *